United States Patent [19]

Ziemba

[11] 3,729,856
[45] May 1, 1973

[54] HOLDER FOR FISH HOOKS

[76] Inventor: Ludwik Ziemba, 441 Cambridge Avenue, Palo Alto, Calif. 94306

[22] Filed: Feb. 2, 1972

[21] Appl. No.: 222,812

[52] U.S. Cl. ...............................................43/57.5 R
[51] Int. Cl. ...............................................A01k 97/06
[58] Field of Search .......................43/57.5 R, 57.5 A

[56] References Cited

UNITED STATES PATENTS

| | | | |
|---|---|---|---|
| 2,284,537 | 5/1942 | Parker | 43/57.5 R |
| 2,597,304 | 5/1952 | Dillingham | 43/57.5 R |
| 2,667,010 | 1/1954 | Anderson | 43/57.5 R |
| 2,670,563 | 3/1954 | Anderson | 43/57.5 R |
| 2,866,295 | 12/1958 | Shanks | 43/57.5 R |

*Primary Examiner*—Louis G. Mancene
*Assistant Examiner*—Daniel J. Leach
*Attorney*—Stephen S. Townsend et al.

[57] ABSTRACT

Apparatus for holding a plurality of fish hooks having leaders attached thereto wherein the apparatus includes a pair of hook-holding sections, one section having a central recess for receiving the other sections. Each section has a number of hook mounts for releasably holding fish hooks in fixed positions and means for keeping the leaders of the hooks separated from each other. Each mount includes a base pivotally mounted on a support and a flexible extension rigid to the base and provided with a free outer end for engaging the barb of a fish hook while the remainder of the extension conforms to the shank of the hook. The two sections are disposed in a shell which can be opened to permit access to the outer section, the latter being separated into two parts to permit it to swing away from the inner section and thereby allow access to the latter.

14 Claims, 14 Drawing Figures

Patented May 1, 1973

HOLDER FOR FISH HOOKS

This invention relates to improvements in the techniques of storing fish hooks with leaders attached to them and, more particularly, to an improved holder for such fish hooks.

In many situations, it is desirable for a fisherman to have a large number of different types and sizes of fish hooks available so that changes from one hook to another can be made quickly and easily. In the past, conventional holders for fish hooks with leaders have not, for the most part, been completely satisfactory in that they have not properly operated to protect the hooks from being deformed or to protect the barbs on the hooks from becoming dull. Moreover, conventional holders have been quite bulky if they are made to hold and store a relatively large number of fish hooks.

The present invention is directed to an improved holder for fish hooks which overcomes the problems of conventional holding devices yet provides a construction which is simple and rugged and provides for storing a wide variety of sizes and types of hooks in a minimum of space. The invention utilizes a pair of elongated hook-holding sections with each section being provided at each end thereof with a number of hook mounts for releasably holding fish hooks in fixed positions as the leaders on the hooks are held separated from each other. Thus, upon selection of a particular hook, one can easily lift it and its leader out of the holder without interference from adjacent hooks and leaders. One of the hook-holding sections surrounds the other section and is suitable for use in storing hooks having relatively short leaders, the other section being suitable for storing hooks having relatively long leaders. Moreover, provision is made on the apparatus for storing other fishing accessories, such as snaps, swivels, lead shot, lures and the like.

A feature of the invention is the construction of each of the hook mounts thereof. Each mount includes a base which is pivotally mounted on an adjacent support and a flexible, generally curved extension secured to and projecting outwardly from the base. The extension thus has a free outer end which serves as an abutment for engaging the inner end of the barb of a hook as the shank of the hook extends along the extension. Since the extension is flexible, it can conform to the J shape of the shank and the fact that the base is pivotally mounted allows the extension to conform to the J shapes of different types and sizes of hooks. Moreover, each mount also has cross ribs thereon which make point contact with the hooks, thereby permitting water on the hooks to drip off the same more readily so as to prevent rusting of the hooks.

When the leaders extend away from the hooks, they are held separated from each other. In the outer section, a coil spring effects this holding action. In the inner section, a number of holding members removably attached to slotted webs performs this function, each holding member having a projection for receiving the loop of a leader and being resilient to permit a wedging of the leader against the adjacent web.

The inner section can be provided with a central recess for receiving a container having two parts which are hinged to move from parallel positions, i.e., in side-by-side relationship, in which they can be inserted in the central recess of the inner section to coplanar positions, whereby access to the interiors of the container parts can be gained.

A further feature of the invention is the way in which the outer section is divided into halves which surround the inner section. The halves are pivotally mounted on an end wall so that they can swing away from the inner section to permit access to the hook mounts thereof. This construction also allows for the use of a shell surrounding the outer section with the shell having a pair of opposed sides which pivot away from the outer section to permit access thereto. Means is provided for releasably locking the shell sides in place and also for releasably locking the two halves of the outer section together.

The primary object of this invention is to provide an improved holder for fish hooks having leaders thereon wherein the holder has a number of flexible hook mounts which are capable of holding respective fish hooks of different sizes and types in fixed positions while the leaders of the hooks are maintained separated from each other and as the hooks are prevented from being deformed, whereby the holder provides a means for storing a wide variety of hooks and a means for making such hooks readily available even though the hooks have leaders.

Another object of this invention is to provide a holder of the type described wherein the holder includes an inner section carried within an outer section with both sections having means for mounting the fish hooks and means for holding leaders on the hooks separated from each other to thereby increase the capacity of the holder while assuring that the hooks are kept readily accessible at all times.

Other objects of this invention will become apparent as the following specification progresses, reference being had to the accompanying drawing for an illustration of the invention.

Figure 1:
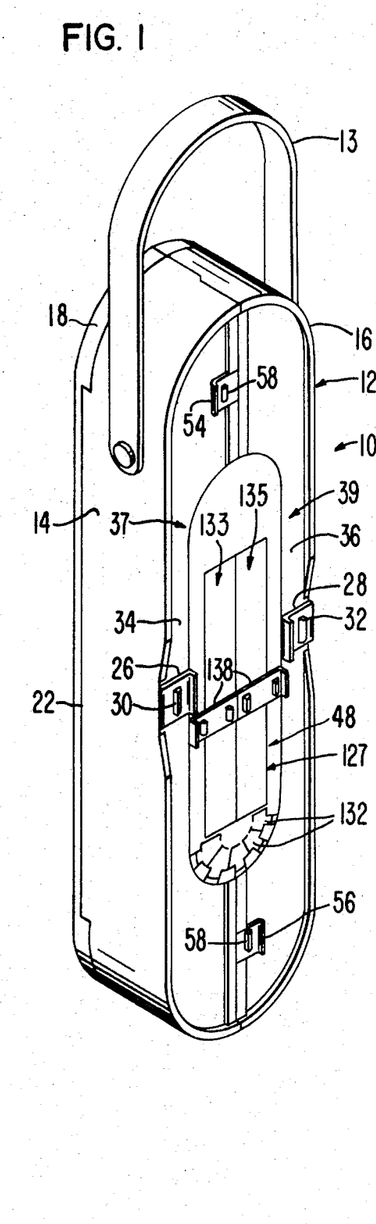
FIG. 1 is a perspective view of the holder for fish hooks which forms the subject of this invention.
Figure 4:
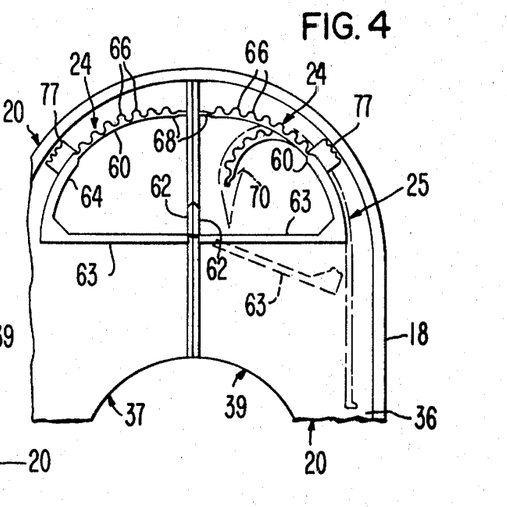
FIG. 4 is a fragmentary, front elevational view of the holder showing a hook mount therein with the mount being shown in two different positions.
Figure 4A:
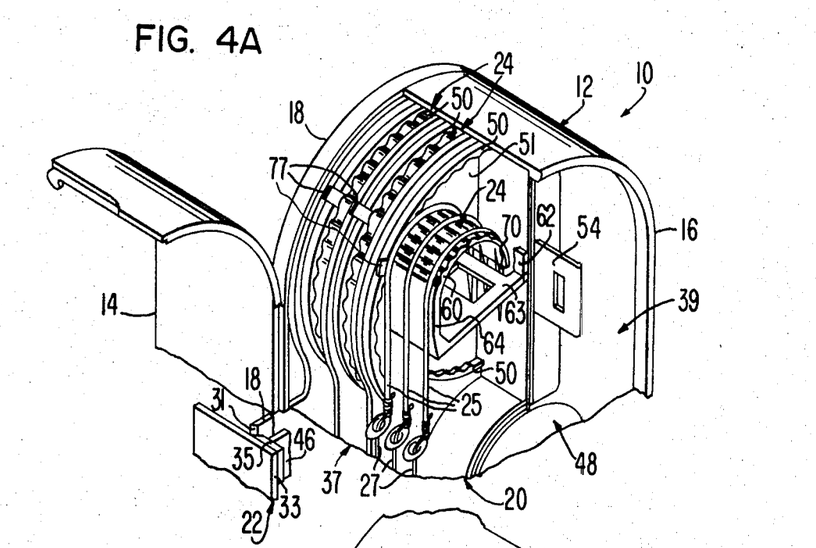
FIG. 4a is a fragmentary, perspective view of the holder with one hook-receiving section exposed to permit access to a number of hooks carried on hook mounts thereof.
Figure 4B:
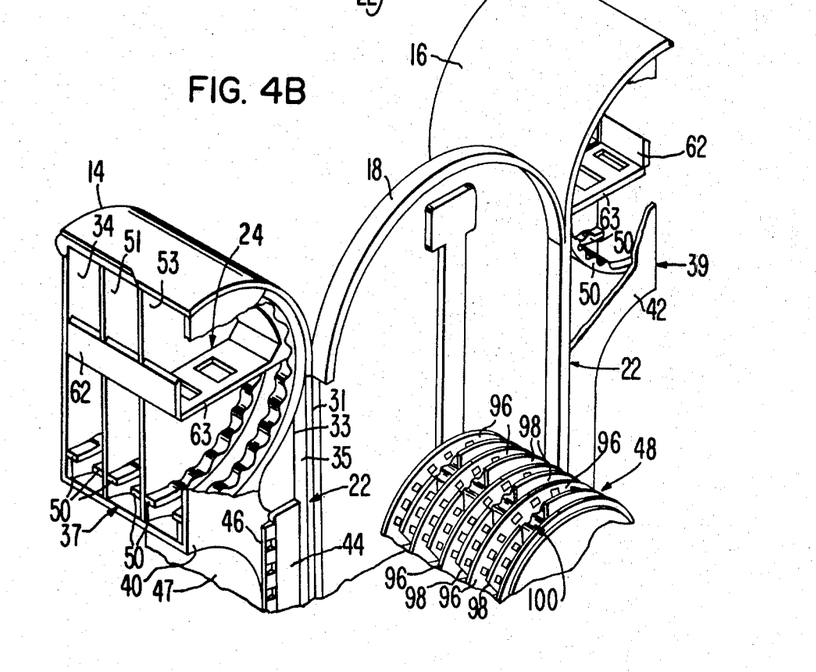
FIG. 4b is a view similar to FIG. 4a but showing a second hook-receiving section exposed to permit access to the hooks carried thereby.
Figure 4C:
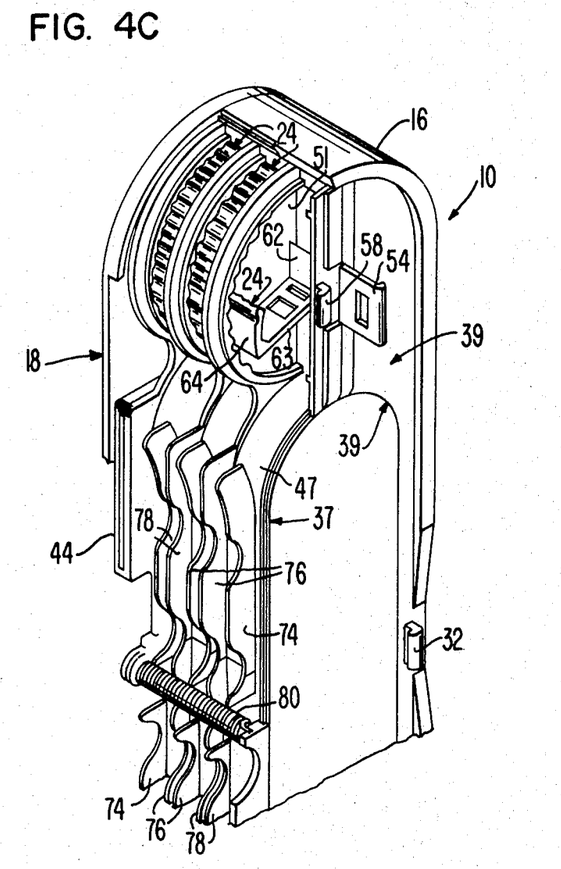
FIG. 4c is a view similar to FIG. 4a but showing the hook mounts without hooks.
Figure 7:
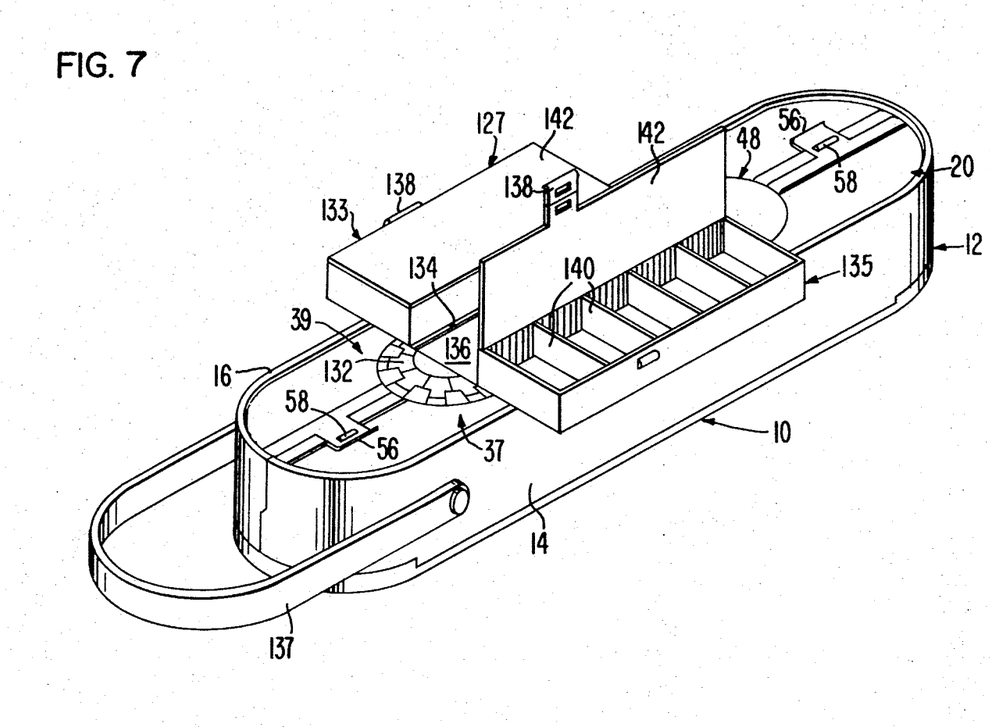
FIG. 7 is a perspective view of the holder showing the way in which an interior container is pulled out of the other hook-receiving section and opened to permit access to its interior.

The hook and accessory holder of this invention is broadly denoted by the numeral 10 and is illustrated in its entirety in FIGS. 1 and 7. Holder 10 comprises an outer shell 12 having a pair of sides 14 and 16 and a rear wall 18 as shown in FIGS. 4b and 4c. Sides 14 and 16 are swingably mounted by respective hinges 22 (FIGS. 1, 4a and 4b) on the side marginal edges of rear wall 18. Each hinge 22 has two hinge lines 31 and 33 (FIGS. 4a and 4b), a strip 35 being between the hinge lines. Shell 12 can be opened by swinging sides 14 and 16 about respective hinge lines 33 to expose an elongated first or outer hook-receiving member 20 having hook mounts 24 at its opposed ends and storing a number of fish hooks 25 and their leaders 27 (FIG. 4a). A pair of hasps 26 and 28 is provided on sides 14 and 16, respectively. These hasps have respective central slots therethrough for receiving projections 30 and 32 secured to and extending laterally from the front wall portions 34 and 36 (FIG. 1) of a pair of halves or sections 37 and 39 (FIG. 4b) defining the two parts of member 20. In this way, sides 14 and 16 are releasably locked to respective front wall portions 34 and 36. This feature allows either of or both sides 14 and 16 to swing away from member 20 to expose either of or both sections 37 and 39.

Sections 37 and 39 have respective rear wall portions 40 and 42 with each rear wall portion having a pair of spaced, slotted receivers 44 into which respective, flat wings 46 are inserted, such wings being rigid to and projecting laterally from strip 35 of the respective hinge 22 (FIGS. 4a and 4b). In this way, sections 37 and 39 are releasably coupled to respective hinges and can pivot into respective open positions (FIG. 4b) from respective closed positions (FIG. 4a) about respective hinge lines 33.

Each of said sections 37 and 39 has an inner sidewall 47 which has a pair of opposed, curved ends terminating short of the ends of the corresponding section and spanning the distance between front and rear wall portions thereof. For instance, sidewall 47 of section 37 spans the distance between front and rear wall portions 34 and 40.

A pair of spaced, parallel, generally semi-circular partitions 51 and 53 are secured to each end of each inner sidewall 47 and extend longitudinally of the same and away therefrom (FIG. 4b). These partitions are essentially the same shape as and parallel to the adjacent ends of the corresponding front and rear wall portions of the section. An arcuate rib 50 having an undulating inner surface is provided on each of the opposed sides of each partition 51 or 53, respectively. Also, a pair of such ribs 50 is provided on the inner surfaces of the respective front and rear wall portions of each of the sections 37 and 39, respectively (FIGS. 4b and 4c). These ribs are used for allowing limited arcuate movement of a number of hook mounts hereinafter described. Thus, there is a group of ribs 50 for each end of each of sections 37 and 39, respectively, whereby the four ends of such sections will be provided with the aforesaid hook mounts. The curved ends of shell sides 14 and 16 overlie the ends of respective sections 37 and 39 (FIGS. 4a, 4b and 4c) when sides 14 and 16 are adjacent to such sections.

Sections 37 and 39 are releasably held in their side-by-side, closed positions (FIGS. 1 and 4c) by a pair of tabs 54 and 56, tab 54 being rigid to front wall portion 36 of section 39 and tab 56 being rigid to front wall portion 34 of section 37. Each of these tabs has a slot for receiving a respective projection 58 carried by the adjacent front wall portion. The projections 58 are press-fitted in the slots of the tabs and the tabs are hinged or otherwise secured to the respective sections 37 and 39.

Figure 5:
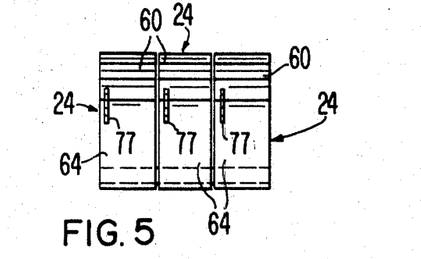
FIG. 5 is a side elevational view of three of the hook mounts of the type shown in FIG. 4.
Figure 6:
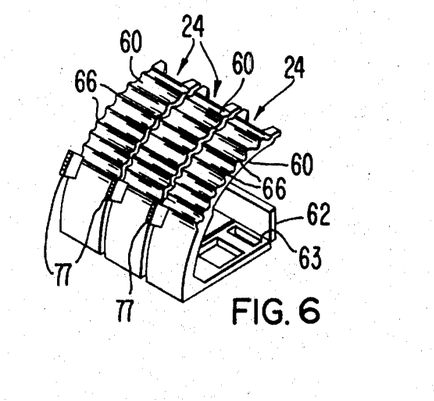
FIG. 6 is a perspective view of the three mounts shown in FIG. 5.

Each of the sections 37 and 39 has a cluster of mounts 24 at each end thereof, respectively. For purposes of illustration, each section has three side-by-side mounts 24 at each of its ends as shown in FIGS. 4a, 4b and 4c. The cluster is shown in FIGS. 5 and 6 and includes a common bar 62 which interconnects the rigid bases 63 of the three mounts 24. Bar 62 is hinged to one end of each base as shown in FIG. 6 and the bases extend away from bar 62. A curved back 64 is rigid to and extends outwardly from the opposite end of the base toward bar 62. Rigid to the outer end of back 64 is a flexible extension 60 having cross ribs 66 thereon providing an undulating surface therefor and the outer end of the extension 60 has an end edge 68 (FIG. 4) over which the barb 70 of a fish hook 25 can be hooked. Extension 60 can flex to conform to the inner curvature of the hook as the latter extends along extension 60 and back 64 in point contact with the outer surfaces of the ribs. Because of such point contact, a wet hook is able to dry much faster since the ribs allow the water to evaporate or drip away much faster from the hook than if the hook were in surface contact with the extension and back.

Extensions 60 of each cluster of mounts 24 are spaced apart as shown in FIGS. 5 and 6 to accommodate partitions 51 and 53 (FIGS. 4b). Since bases 63 are hingedly coupled to bar 62, mounts 24 can pivot independent of each other and relative to such partitions so as to allow the mounts to move into the various locations at which extensions 60 thereof conform to the hooks. As shown in FIG. 4, a base 63, shown in dashed lines, is in a downwardly extending position which corresponds to the flexed condition of its extension 60 when a hook is mounted thereon and the extension conforms to the inner curvature of the hook.

A tab 77 is carried on each back 64 so that the corresponding extension 60 can be manually pivoted up or down with respect to bar 62. Ribs 66 mate with the undulations of ribs 50 so that extensions 60 can be releasably seated in place. This is shown in FIG. 4b which shows an extension 60 in a generally fixed position; however, after a hook has been hooked over outer end edge 68 of an extension 60, it is only necessary to push inwardly on the corresponding tab 77 to allow pivotal movement of the corresponding base 63 relative to bar 62 until the corresponding mount 24 is in a position at which the shank of the hook extends tangentially from the mount and generally parallel with central wall 47 as shown in dashed lines in FIG. 4.

Bar 62 can be coupled in any suitable manner to partitions 51 and 53. For purposes of illustration, bar 62 is of resilient material and has a beveled edge which snaps into slots formed in the end edges of partitions 51 and 53 (FIG. 4b). This allows the insertion of each cluster of mounts 24 in place without requiring any fastening means, such as an adhesive or the like.

Figure 2:
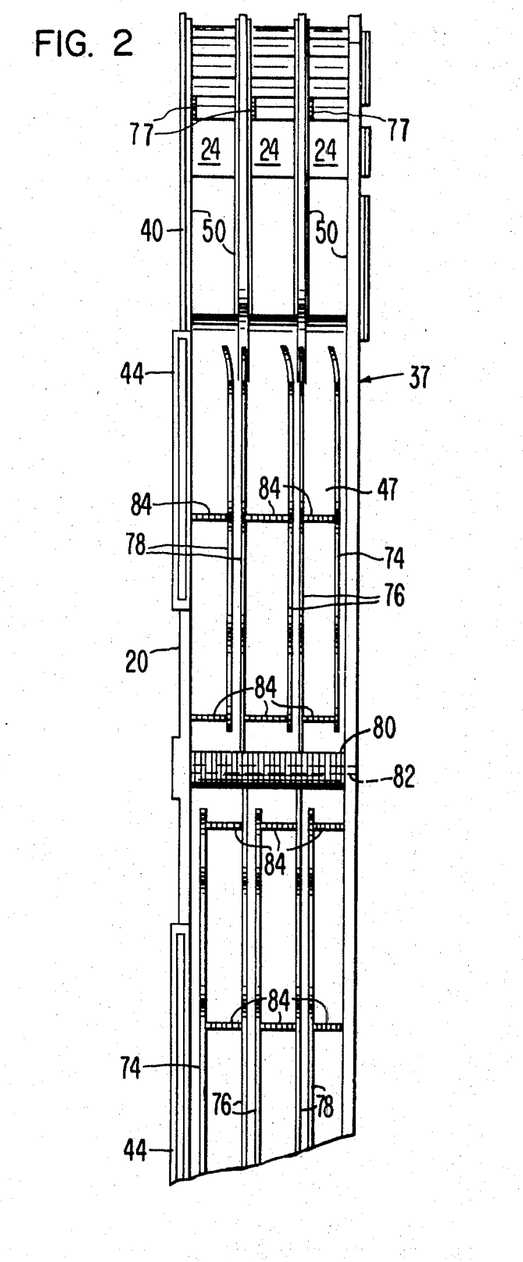
FIG. 2 is an enlarged, fragmentary side elevational view of the holder when one side cover is removed.

The outer surface of each central wall 47 is provided with a number of dividers 74, 76 and 78 (FIGS. 2 and 4c). These dividers are used to keep the leaders of the hooks coupled with respective mounts straight and in confined positions so as to prevent the formation of loops and other entangling configurations in the leaders. For instance, divider 74 is near the front wall portion 34 of section 37 (FIG. 2) and cooperates therewith to present a confined region for the leaders of hooks carried by the right-hand upper mount of FIG. 2. Similarly, dividers 76 are adapted to confine the leaders of hooks carried on the middle mount 24 and dividers 78 are disposed to confine the leaders of hooks on the left-hand mount 24 above the same.

The leaders are generally long enough so that they extend at least midway to the length of the corresponding section. A coil spring 80 is disposed across the outer surface of corresponding wall 47 and allows the leaders to be embedded between the convolutions of the spring. A mounting rod 82 for the spring also limits the inward travel of the leaders in between the convolutions thereof.

Spring 80 serves to anchor the leaders of the hooks on mounts 24 at both ends of the corresponding section. In addition, the corresponding central wall 47 has cross strips 84 divided with comb-like grooves therein for receiving further extensions of the leaders. As shown in FIG. 2, the section 37 has additional dividers 74, 76 and 78 for the leaders of hooks carried by mounts 24 on the opposite end of section 37. These other dividers are staggered with respect to the first-mentioned dividers.

A second hook mounting member 48 is provided for holder 10 and is positioned so that it is between sections 37 and 39 when the latter are in their closed positions (FIG. 1). Member 48 is rigid to and projects forwardly from rear wall 18 but can be removably mounted thereon, if desired. Member 48 further includes a continuous, outer wall 90 which includes a pair of sidewall sections 92 and a pair of end wall sections 94 which are curved and integral with sidewall sections 92. The outer surface of wall 90 has a number of continuous dividers 96 (FIG. 9) which extend completely about wall 90. A number of end dividers 98 are also rigid to wall 90 and are adjacent to respective ones of dividers 96 to form narrow channels in which leaders of hooks can be received. Member 48 is especially suitable for use in mounting hooks having relatively long leaders, such leaders being sufficiently long so as to be wrapped several times around the length of member 48.

Member 48 has a number of hook mounts 100 thereon which are very similar in construction to mounts 24. For purposes of illustration, a pair of clusters of such mounts 100 is provided for only one end of member 48 although a cluster could be provided for the opposite end thereof. These two clusters are on opposed sides of the upper end of member 48 (FIGS. 8 and 9).

Figure 8:
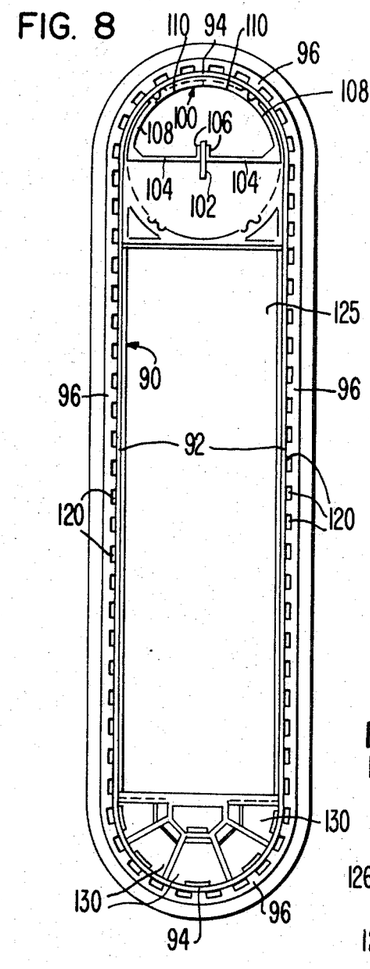
FIG. 8 is a front elevational view of the other hook-receiving section.

For mounting the two clusters, a support strip 102 is provided as shown in FIG. 8. Each mount 100 includes a base 104 hingedly mounted on a bar 106 rigid in any suitable manner to strip 102. The corresponding mount 100 has a rigid back 108 which is curved and extends upwardly from base 104. A flexible extension 110 having cross ribs thereon is rigid to and extends outwardly from the outer end of back 108. Each extension 110 has an outer edge 112 over which the barb of a hook can be hooked much in the same manner as that shown in FIG. 4. Thus, for all intents and purposes, each mount 100 is substantially the same construction as each mount 24, but of a smaller dimension.

Each mount 100 has a tab 114 which projects laterally therefrom and allows the corresponding mount to be manually moved with respect to the adjacent end wall section 94. Ribs having undulations similar to ribs 50 can be provided on the inner surface of the corresponding end wall section 94 so that the corresponding mount 100 can be releasably locked or held in a fixed position, yet allowed to be pivoted so that the shank of a hook would extend straight outwardly from the mount at a tangent rather than to be angled therefrom. Thus, this accounts for the reason of hinging bases 104 to common bar 106.

Figures 8A, 9:
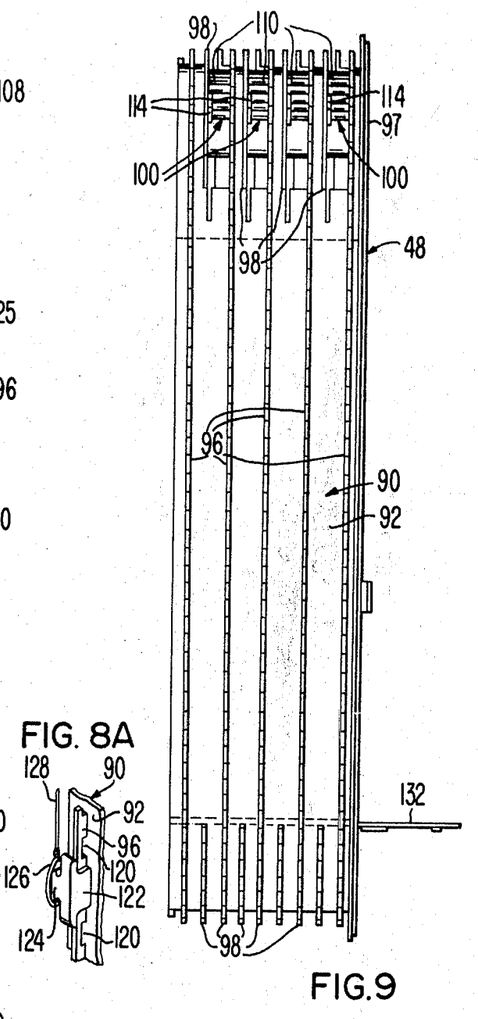
FIG. 8a is an enlarged, fragmentary, perspective view of the section of FIG. 8, showing the way in which a loop holder is removably coupled thereto.
FIG. 9 is a side elevational view of the section of FIG. 8.
Figure 10:
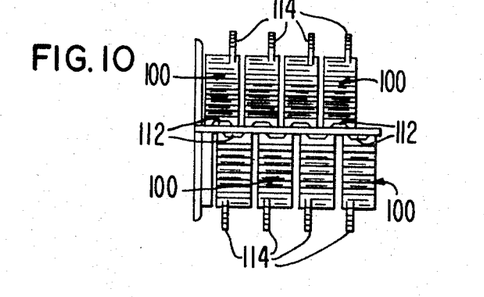
FIG. 10 is a fragmentary, top plan view of the hook mounts of the section of FIGS. 8 and 9, showing the staggered relationship of such hook mounts.

Each divider 96 is provided with slots 120 therethrough as shown in FIGS. 8 and 8a. These slots are adapted to receive a mounting projection (not shown) on a loop retainer 122 of the type having a lateral projection 124 for receiving the loop 126 of a leader 128. Thus, when it is desired to place tension on leader 128, the mounting projection of retainer 122 can be separated from a particular slot 120 and moved until there is tension on the leader; then, the mounting projection is forced into the adjacent slot 120, thereby maintaining tension on the leader. Each divider 96 can have one or more of such retainers 122 to accommodate many different leaders.

The opposite end of member 48 may be provided with compartments 130 for receiving lead shot and other fishing accessories. These compartments are closed by a swingable cover 132 which, in FIG. 9, is shown in an open position. It is a simple matter to remove materials from the compartments once the cover is opened.

Member 48 has a central, open recess 125 for receiving a container 127 (FIG. 7) having two box-like parts 133 and 135. Each part is hingedly coupled along a hinge line 134 to a back plate 136, the width of the back plate being twice the thicknesses of the two parts and substantially equal to the width of recess 125. Thus, these two parts can be pivoted from the open positions shown in FIG. 7 into side-by-side, generally parallel positions and then moved inwardly into recess 125 for storage therein (FIG. 1). A pair of hasps 138 can then be utilized to retain parts 133 and 135 in place as shown in FIG. 1. Each of the parts can be provided with partitions 140 as shown in FIG. 7 to segregate the accessories carried thereby. When the two parts are to be opened, they are pulled out of recess 124 and placed in generally coplanar relationship to each other as shown in FIG. 7 so that the lids 142 thereof can be opened to gain access thereto.

In use, outer and inner hook-receiving members 20 and 48 are initially disposed in shell 12 and, assuming that no hooks are on the sections, and if it is desired to store hooks in holder 10, sides 14 and 16 and sections 37 and 39 of outer member 20 are swung outwardly of inner member 48 to permit access to the hook mounts 100 thereof. This is done by separating hasps 54, 56 from projections 58 so that outer member 20 can be separated into halves as shown in FIG. 4b. Then, hooks and leaders can be coupled with inner member 48, the hooks being coupled to mounts 100 and the leaders being wound about member 48 between a pair of corresponding dividers 96 and 98. A number of loop-holding retainers 122 (FIG. 8a) can be mounted at desired locations along dividers 96 to hold the loops of leaders 128 which are attached to the hooks carried by mounts 100.

Figure 3:
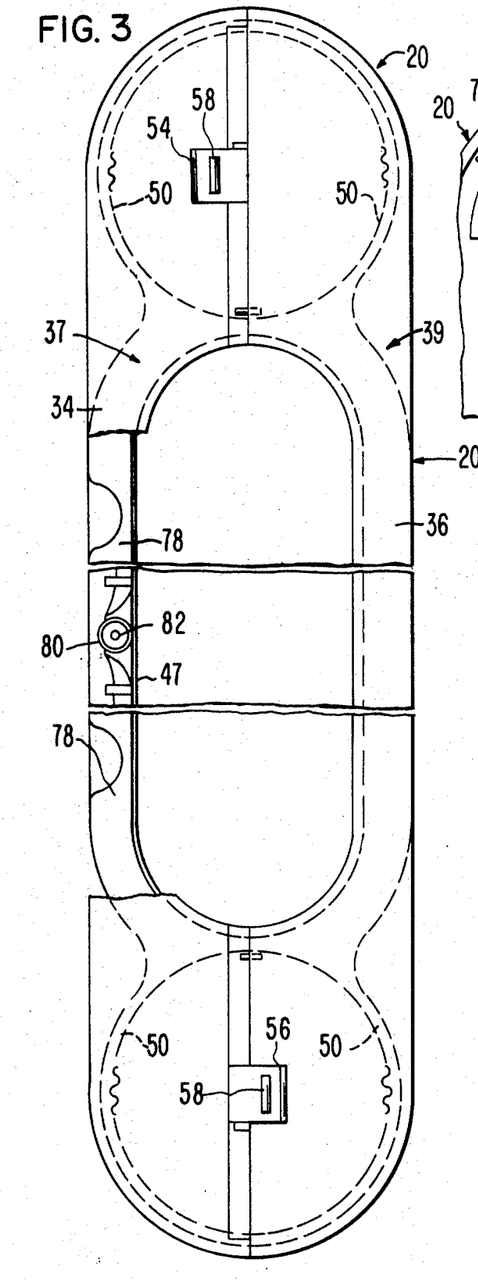
FIG. 3 is a front elevational view of the holder, partly broken away, and illustrating the same when an inner section has been separated from the outer, main section.

Sections 37 and 39 of outer member 20 are then swung into their closed positions shown in FIGS. 3, 4 and 4a and hooks 25 can then be coupled with respective mounts 24. The leaders 27 of these hooks are then inserted between dividers 74, 76 and 78 and forced into spring 80 so that the leaders are kept separate from each other. Finally, sides 14 and 16 are closed and held in place by hasps 26 and 28.

Accessories can be placed in compartments 130 and in container 127 at any time since these elements are accessible regardless of the locations of sides 14 and 16 and sections 37 and 39 of outer member 20. A handle 137 coupled with sides 14 and 16 permits holder 10 to be hand-carried.

I claim:

1. A holder for fish hooks with each hook having a shank, a barb at one end of the shank, and a leader connected to the opposite end of the shank comprising: an elongated support having means at one end thereof for mounting a number of said fish hooks in side-by-side relationship thereon with the leaders on the hooks extending away therefrom; means coupled with the support for receiving the leaders of the fish hooks when the latter are mounted in said relationship, said mounting means including an elongated, flexible mount having a free outer end presenting an abutment for the inner end of the barb of a hook, whereby the hook can be coupled to and held in a fixed position on the mount when the shank of the hook extends longitudinally thereof, said mount being conformable to the shank when said barb is in said fixed position; and means pivotally coupled to said support for removably covering the mounting means and the holding means.

2. A holder as set forth in claim 1, wherein is provided a mount for each hook, respectively, each mount comprising a base and a curved extension rigid to one end of the base and projecting outwardly therefrom, the extremity of the extension remote from the base defining said free outer end of the mount, said extension being flexible to conform to the shape of the shank when said hook is in said fixed position.

3. A holder as set forth in claim 2, wherein the outer surface of the extension is undulating with the undulations extending widthwise thereof.

4. A holder as set forth in claim 2, wherein the base of each mount is pivotally mounted on said support for movement relative thereto.

5. A holder as set forth in claim 1, wherein said support includes an end wall, said covering means including a pair of sides pivotally mounted on and extending longitudinally of said end wall for movement into and out of respective positions in which they define with said end wall a shell for at least partially enclosing said mounting means and said holding means.

6. A holder as set forth in claim 1, wherein the leader-receiving means includes a coil spring having a central core therethrough, said spring being spaced from said mounting means and disposed transversely to the leaders when the latter extend away from respective hooks disposed in respective fixed positions.

7. A holder as set forth in claim 1, wherein said leader-receiving means includes an outer surface, and a number of spaced dividers extending along said outer surface and dividing the same into a number of leader-receiving grooves, each divider having a number of slots therein, and including a loop-holding member having a mounting projection selectively receivable within a slot of any one of said webs and a loop-holding projection for receiving the loop of a leader, the member being resilient and having a portion engageable with the adjacent web, whereby the adjacent part of a leader can be held between the portion and the adjacent web.

8. A holder for fish hooks with each hook having a shank, a barb at one end of the shank, and a leader connected to the opposite end of the shank, comprising: a support; an outer hook-holding member and an inner hook-holding member, the outer member having a central recess therein and a pair of sections on opposite sides of said recess, said inner member being secured to said support and disposed within said recess; means hingedly mounting said sections on said support for movement toward and away from said inner member to thereby alternately expose and cover the same, each of the members having a pair of opposed ends with at least one end of each member being provided with a number of hook mounts thereon, each mount having a resilient extension capable of conforming to a portion of the shape of a hook, each extension having a free outer end over which the barb of a hook can be hooked so that the hook will be removably coupled to the mount, each member having means thereon for receiving the leaders of the hooks carried by the mounts thereof; and means hingedly coupled with the support for at least partially covering the outer member.

9. A holder as set forth in claim 8, wherein said support includes a wall, said covering means including a pair of sides defining with said wall a shell, and means carried by the sides for releasably holding the same in positions in which the sides partially cover the outer member.

10. A holder as set forth in claim 8, wherein each section has a central wall provided with opposed arcuate ends, the central walls of said sections defining said recess when the sections are adjacent to said inner member.

11. A holder as set forth in claim 8, wherein the inner member has a central recess therein and including a container removably mounted in the recess and provided with means for holding fishing accessories.

12. A holder as set forth in claim 8, wherein said leader-receiving means includes a spring carried by the outer member and extending transversely of the longitudinal axis of the outer member, said spring having a central core therein to limit the inward travel of a leader.

13. A holder as set forth in claim 8, wherein each extension has an undulating outer surface, the undulations being widthwise of the extension.

14. A holder as set forth in claim 8, wherein each mount has a base pivotally mounted on the adjacent support, whereby the base can pivot in a direction to cause the extension to conform to a fish hook.

* * * * *